(12) United States Patent
Fischer

(10) Patent No.: US 10,633,888 B1
(45) Date of Patent: Apr. 28, 2020

(54) CONTROL SWITCH CONNECTION APPARATUS

(71) Applicant: Lanell Fischer, Van Nuys, CA (US)

(72) Inventor: Lanell Fischer, Van Nuys, CA (US)

( * ) Notice: Subject to any disclaimer, the term of this patent is extended or adjusted under 35 U.S.C. 154(b) by 0 days.

(21) Appl. No.: 16/550,259

(22) Filed: Aug. 25, 2019

(51) Int. Cl.
*E05B 19/00* (2006.01)
*G07C 9/00* (2020.01)
*B60R 25/24* (2013.01)

(52) U.S. Cl.
CPC ........ *E05B 19/0082* (2013.01); *B60R 25/245* (2013.01); *G07C 9/00309* (2013.01); *G07C 9/00944* (2013.01); *G07C 2009/0038* (2013.01); *G07C 2009/00293* (2013.01); *G07C 2009/00444* (2013.01); *G07C 2009/00555* (2013.01); *G07C 2009/00984* (2013.01)

(58) Field of Classification Search
CPC .............. E05B 19/0082; B60R 25/245; G07C 9/00944; G07C 9/00309; G07C 2009/00984; G07C 2009/00444; G07C 2009/00555; G07C 2009/00293; G07C 2009/0038
USPC ................... 340/5.61, 5.6, 5.25, 5.1; 341/176
See application file for complete search history.

(56) References Cited

U.S. PATENT DOCUMENTS

| | | | | |
|---|---|---|---|---|
| 5,864,297 | A * | 1/1999 | Sollestre | G07C 9/00817 340/426.36 |
| 6,545,629 | B1 * | 4/2003 | Johnson | B60R 25/24 200/9 |
| 7,015,791 | B2 * | 3/2006 | Huntzicker | G07C 9/00182 340/12.5 |
| 7,724,125 | B2 * | 5/2010 | Ghabra | B60R 25/24 340/5.64 |
| 8,487,743 | B2 * | 7/2013 | Proefke | B60R 25/24 340/5.72 |
| 9,262,880 | B2 * | 2/2016 | Miyazawa | G07C 9/20 |
| 9,865,111 | B2 * | 1/2018 | Hermann | G07C 9/00309 |
| 2017/0079257 | A1 * | 3/2017 | Haensgen | H04W 84/20 |
| 2017/0276113 | A1 * | 9/2017 | Hashim | F02N 11/0866 |

* cited by examiner

*Primary Examiner* — Nam V Nguyen

(57) ABSTRACT

The present invention relates to a method that allows a CSCA to enable an iFOB key system once it is turned on by pressing a function button. When the function button is released, the iFOB key system is turned off. The iFOB key system includes the ERFTS, so when the iFOB key system is turned on/off, the ERFTS is also turned on/off. The embodiment of the CSCA has a double-action switch, a triple-action switch, a timer, a timer circuit and all of the circuitries that are associated with an iFOB key. The CSCA controls the length of time that current is allowed to flow from a battery source to an iFOB key system; it is this type of control that prevents an ERFTS and a customer's property from being compromised. The iFOB key system is always in the off position until it is turned on.

4 Claims, 14 Drawing Sheets

CONTROL SWITCH CONNECTION APPARATUS

BACKGROUND OF THE INVENTION

1. Field of the Invention

According to an embodiment of the present invention, which is a Control Switch Connection Apparatus (CSCA), it pertains to a method for controlling the current and transmission of an Electronic Radio Frequency Transmitted Signal (ERFTS) when relating to a remote keyless entry system for vehicles. More specifically, the embodiment of the CSCA invention pertains to controlling the length of time that a fob key system is on and how long an ERFTS of this fob key system is on and transmitting during the activation and operations of a vehicle's functions by a remote control.

The embodiment of this invention relates to improving the security of the fob key's ERFTS. The ERFTS is responsible for the communication between the vehicle and the fob key. Currently, the present fob key systems allow these ERFTS to be continually broadcasted out in the open without any signal protection from calculated, malicious criminal attackers who potentially replicate the ERFTS and then use the counterfeit signal to effectively bypass the fob key's security features enabling them to make off with stolen property while they themselves remaining undetected. The embodiment of this invention provides a solution to this problem by creating a new way of securing an ERFTS. In some embodiments the inventor's solution include using a specifically designed CSCA that will prevent these malicious criminal attacks on an ERFTS.

Wireless remote control units for use with motor vehicles are well known in the art. In this discussion, there are two types of fob keys that will be mentioned: the fob key with a CSCA integrated into its system/printed circuit board (PCB) will be designated as an intelligent FOB (iFOB) key, the fob key without the CSCA will be designated as a fob key.

With the embodiment of an iFOB key there exists the ability to add protection to fob keys while incurring minimal additional costs. For the implementation of the CSCA across the board of conventional fob keys is a very inexpensive endeavor and can be economically mass-produced.

2. Description of Related Art

Wireless remote control fob keys have been in use for a number of years and for that same period of time they have had the problem of being compromised by anyone with electronic code grabbers and frequency scanners, just to name a few. With these devices criminals are able to captures, counterfeit and copy the fob key's signals.

The CSCA invention addresses this elusive problem. Until the invention of the CSCA there has been very little that could be done in addressing this type of widespread criminal behavior. Solutions to solving this problem have been attempted but to no avail and none of the offered solutions to date have been sufficient enough when it came to addressing the needs of this industry.

The problem with the fob keys that are in use today is that they allow for their communication transmission signals to be compromised, whereas an invention such as a CSCA all but eliminates this problem by integrating the technology of the CSCA into the circuitries of the fob keys. This integration of a CSCA is a very inexpensive solution to an age-old problem, a problem that can now be addressed and solved with ease.

BRIEF SUMMARY

The present invention, the CSCA, has the advantage of preventing an iFOB key's system from being compromised. It is able to accomplish this because it does not allow an ERFTS to be on and transmitting continuously when an iFOB key is not being used. The CSCA will turn on the system of an iFOB key but only for the amount of time that is needed for the function of the iFOB key to be carried out.

The main problem with the fob keys that are on the market today is that they allow thieves to steal or gain access to a vehicle's fob key radio frequency (RF) signal. Thieves are able to steal and capture the fob key's signal using devices purchased off the Internet. The embodiment of the iFOB key solves this problem by denying thieves' access to the iFOB key's ERFTS. In the examples that reference the system, let it be known that the system consists of the circuitry and electronics of an iFOB key. The embodiment of a CSCA of an iFOB key is that it does not allow for the ERFTS and the system to be on and operational until a function button is pressed.

Another problem of the current fob keys that are in use is that they are designed to always be on and transmitting their ERFTS with total disregard for security. The system and ERFTS of an iFOB key is always turned off when its not being used. By the iFOB key always being off, current is not allowed to flow until a circuit is closed. By not allowing current to flow, there is no ERFTS being transmitted therefore there is no ERFTS to be captured and copied. The system and the ERFTS are both turned on and operational when a function button on an iFOB key is pressed.

Of the four switches, switch 1, switch 3 and switch 4, allow the system 40 and the ERFTS to be on only for the duration that their corresponding function button is being pressed, when the function button is released, the system 40 is turned off and the ERFTS is terminated. Switch 2 is different from the other three switches in that it will allow for the system 40 and the ERFTS to be operational for a pre-set period of time even after the function button has been released. Once the pre-set period of time has expired, the system 40 is turned off and the ERFTS transmission is terminated. These and other features, aspects, and advantages of the present invention will become better understood with reference to the following description and claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

Figure 1:
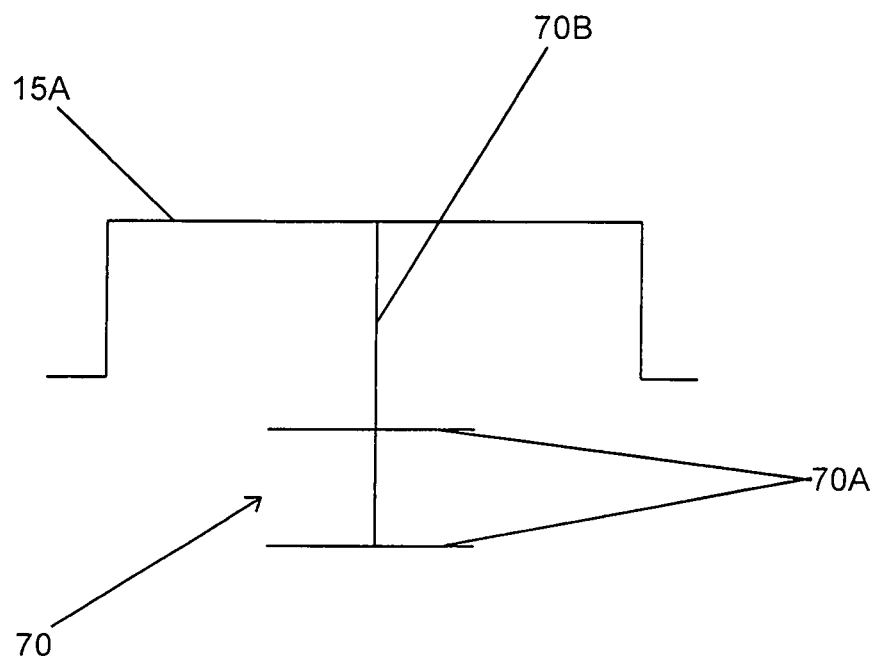
FIG. 1 is a view of a switch-plunger, a contact connector according to an embodiment of the present invention.

REFERENCE NUMBERS IN FIGURES 1. function-lock-button
2. function-unlock-button
3. function-trunk release-button
4. function-alarm-button
5. iFOB key
5A. front half of the iFOB case
5B. back half of the iFOB case
5C. snap-edges
5D. spare key
5E. spare key trigger release
10. iPCB
10A. iPCB back
10B. rubber button pad
10C. iPCB front
15. double-action switch
15A. double-action plunger
20. triple-action switch
20A. triple-action plunger
25. system contacts
30. system-timer contacts
35. function-contact
40. system
40A. system-trace
40B. parallel-trace 1 and 2
45. functions
45A. functions trace
50. timer
55. timer-trace
60. timer-circuit
65. battery junction
65A. contact nodules
65B. battery contact
70. contact connector
70A. conductive material
70B. nonconductive material
75. battery slot
80. battery junction housing
85. ps-trace
90. positive battery contact
95. negative battery contact
100. battery
100A. battery's positive (+) surface
100B. battery's negative (−) surface
A. timer-ground
B. timer-power source

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. When mentioning the system 40 let it be known that this includes the whole of an iPCB 10 and all electronic circuitries that are associated with an iFOB key 5. The function buttons and the action switches are two of the mechanical components of an iFOB key 40.

FIG. 1 is an example and an embodiment of double-action plunger 15A with an attached contact-connector 70. A contact-connector 70 is an embodiment of nonconductive-material 70B with conductive-materials 70B attached; the conductive materials 70A are able to close a circuit when a double-action plunger 15A or a triple-action plunger 20A is pushed.

Figure 2:
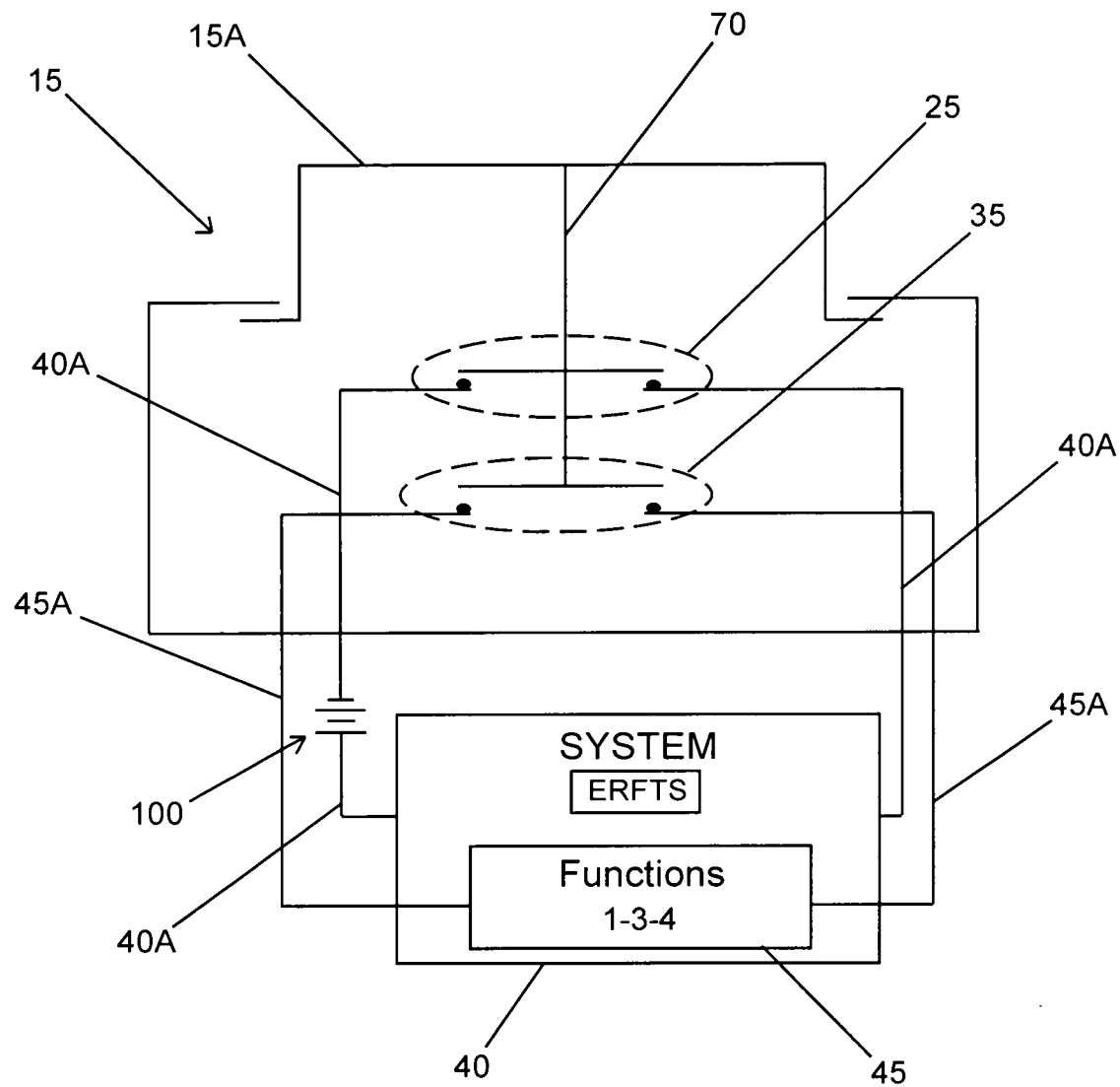
FIG. 2 is a view of a double-action switch, system-contacts, function-contacts, a power source, traces, system, ERFTS and functions according to an embodiment of the present invention.

FIG. 2 is an example and an embodiment of a double-action switch 15 with a double-action plunger 15A that has a contact-connector 70 attached. The hashed lines designates an area of the double-action switch 15 known as the system-contact 25, this is an area where a circuit is closed and opened; the second set of hashed lines designates an area of the double-action switch 15 known as the function contact 35, this is an area where a circuit is closed and opened. The system-traces 40A and functions-traces 45A allows current to flow from location to location. For example, when the function-lock-button 1 is pressed, this action will push the double-action plunger 15A causing the contact connector 70 to close two circuits: a system-contact 25 circuit and a function-contact 35 circuit. The closure of a system-contact 25 circuit will allow current to flow from a battery 100, through a system-trace 40A and turning on the system 40. Once the system 40 is turned on, the ERFTS starts transmitting. The closure of a function-contact 35 will allow the function 45 signals to travel out through a function-trace 45A. In FIG. 2 the functions 45 and the ERFTS along with all of the circuitry and components are part of the system 40.

The initial press and release of the function-lock-button 1 allows enough time for the function of the function-lock button 1 to be carried out.

Once the function-lock button 1 is released, the system-contact 25 and the function-contact 35 are both opened resulting in the system 40 and the ERFTS being turned off and the function signal being terminated.

Figure 2A:
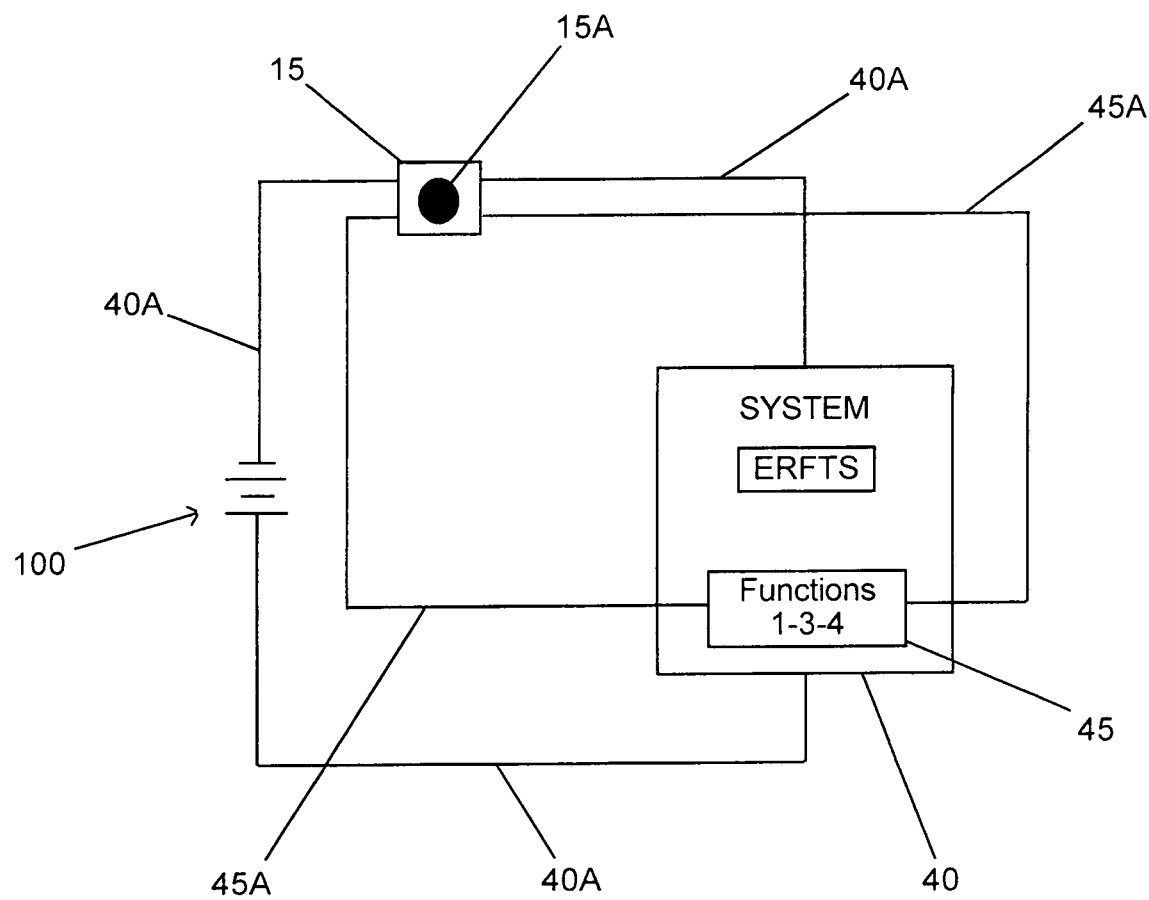
FIG. 2A is a view of a double-action switch, a power source, traces, system, ERFTS and functions according to an embodiment of the present invention.

FIG. 2A is an example and an embodiment that shows how a double-action switch 15 is integrated into the connection of the CSCA. The double-action switches 15 get pressed whenever the function-lock button 1, the function-trunk release button 3, or the function-alarm button 4 is pressed. These are the switches that turn on the system 40 and activate the functions 45 of the system 40 so that the initial functions of the function buttons can be performed. This illustration also shows how the ERFTS and the functions 45 are parts of the system 40.

Figure 3:
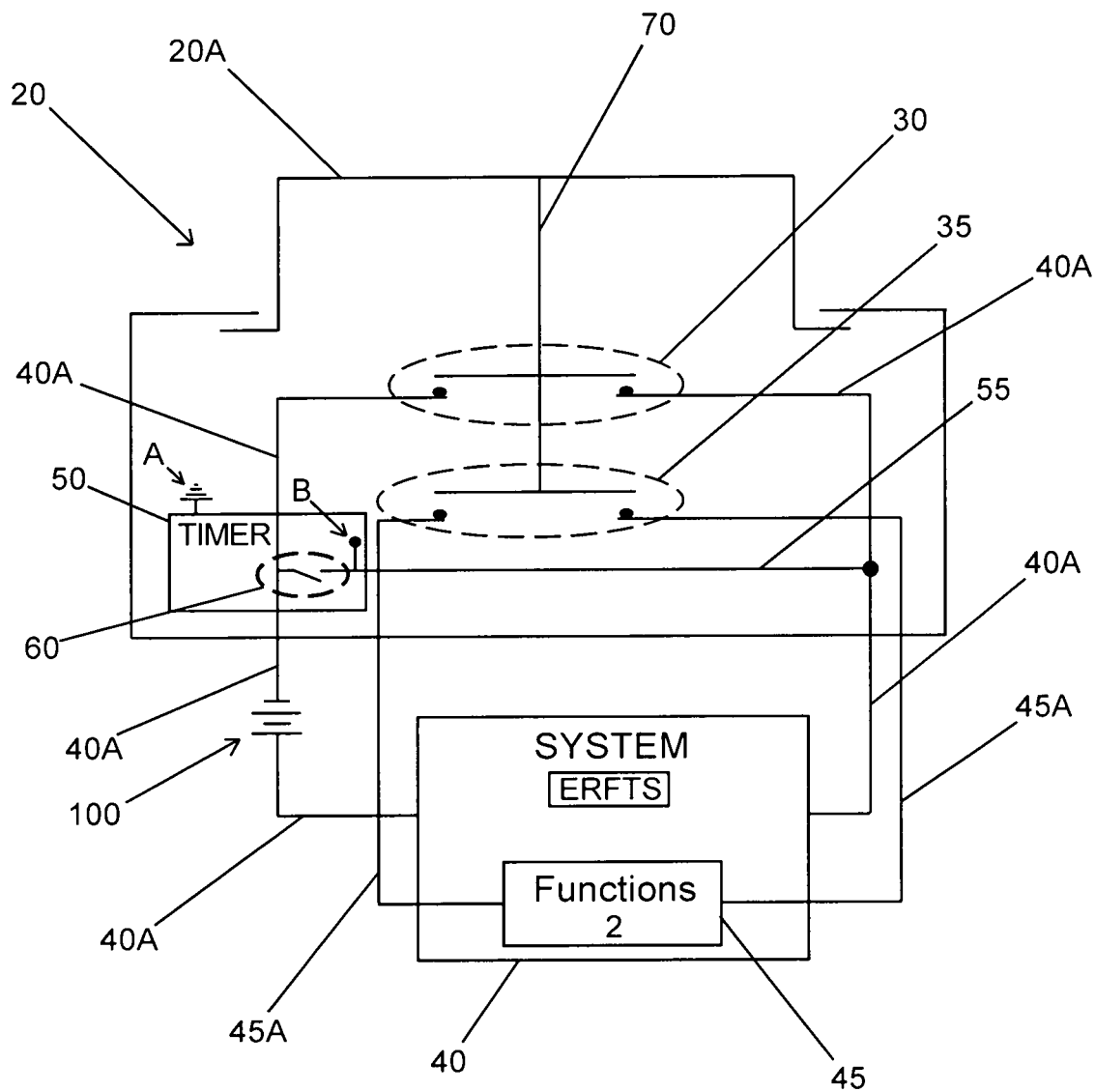
FIG. 3 is a view of a triple-action switch, a power source, system, ERFTS, functions, traces, a timer-ground, a timer-power source, a timer switch opened, triple-action plunger, system-timer contacts, function-contact, contact connector, and timer according to an embodiment of the present invention.

FIG. 3 is an example and an embodiment of a triple-action switch 20, a triple-action plunger 20A, a contact-connector 70, hashed lines that show the system-timer contact 30, hashed lines that show the function contact 35, system 40, system-traces 40A, timer 50, functions 45, a function-trace 45A, a timer-ground A, and a timer-power source B. When a function-unlock-button 2 is pressed, it will then push a triple-action plunger 20A of the triple-action switch 20, this action will close a system-timer contact 30 circuit, close a function-contact 35 circuit and activate a timer 50. When the timer 50 gets activated it will close the timer-circuit 60 that is in an opened position inside the hash lines. Closing a system-timer contact 30 will allow current to flow from a battery 100 source through a system-trace 40A, to the system 40 where the system 40 is turned on; closing the function-contacts 35 allows the initial function of the function-unlock-button 2 to be carried out; once the timer 50 is activated, it will close the timer-circuit 60 and initiate the count down of the pre-set period of timer. The turning on of the system 40 also turns on an ERFTS and the turning off of the system 40 will turn off the ERFTS. All of the hashed lines are to point out the circuitries that are being discussed.

Figure 3A:
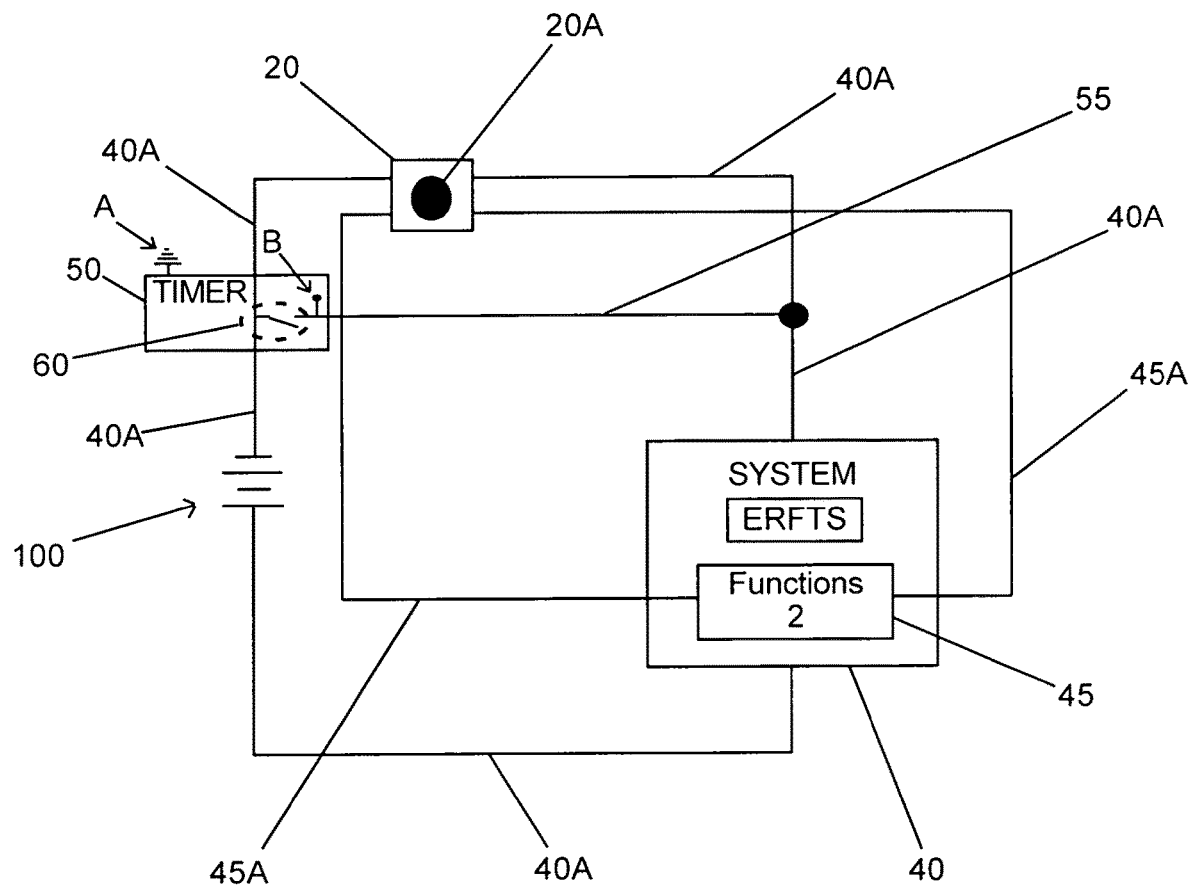
FIG. 3A is a view of a triple-action switch, a power source, system, ERFTS, functions, traces, a timer-ground, a time-power source, and a timer according to an embodiment of the present invention.

FIG. 3A is an example and an embodiment of a triple-action switch 20 with its triple-action plunger 20A; it is the triple-action plunger 20A that gets pushed when the function-unlock-button 2 is pressed. The pushing of the triple-action plunger 20A will allow current to flow from the battery 100, through the system-trace 40A, through the timer 50, through the system-trace 40A, through the triple-action switch 20, through the system-trace 40A, to the system 40, through the system-trace 40A and returning back to the battery 100. As current enters the system 40, the system gets turned on. Once the system 40 becomes active the ERFTS starts transmitting and the functions 45 is now active. The pushing of the triple-action plunger 20A will also close the function-contact 35; this will allow the functions 45 to implement the actions of the function-unlock-button 2. The hash lines denote the area of the timer-circuit 60, which is in the opened position.

Figure 3B:
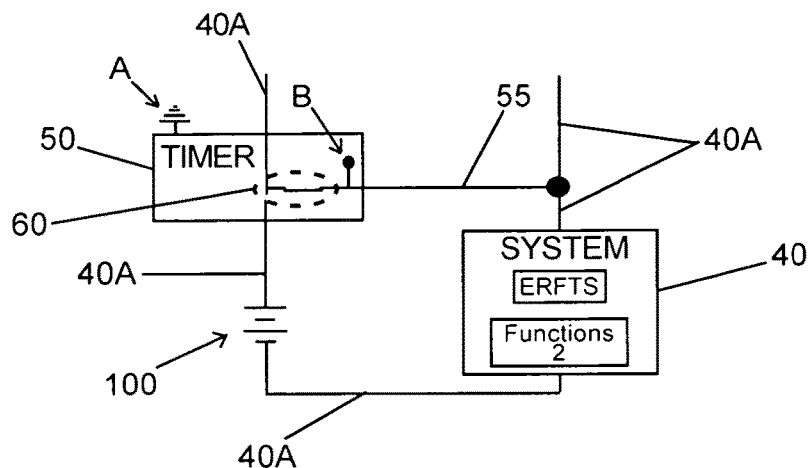
FIG. 3B is a view a power source, system, ERFTS, functions, traces, a timer-ground, a timed-power source, a timer-circuit closed, and a timer according to an embodiment of the present invention.

FIG. 3B is an example and an embodiment that shows an illustration of how the system 40 remains on for a pre-set period of time once the function-unlock button 2 has been released and the triple-action plunger 20A returned back to its unengaged resting position. Once the triple-action plunger 20A is pushed, this will close the system-contact 30, this will now allow current to flow from the battery 100, through the timer 50, through the triple-action switch 20, through to the system 40 and back to the battery 100. As the current flows through the timer 50, it will cause the timer-circuit 60 to close. Once the timer-circuit 60 is closed, current is rerouted through the timer-trace 55. As current is flowing through the timer-trace 55, it also flows through the timer-power source B, the timer 50 and out to the timer-ground A.

The closing of the timer-trace 55 reroutes the current from the battery 100 to the system 40; the rerouting of current enables the system to remain on for a pre-set period of time once the function-unlock button 2 is released. This current that flows through the timer-power source B, from the timer-trace 55, will activate the timer 50 so that it can hold the timer-circuit 60 in the closed position for the pre-set period of time and at the same time the timer 50 will initiate the pre-set period of time to start the count down to zero. Once the pre-set period of time expires, the timer-circuit 60 is allowed to return back to an opened position resulting in the system 40 being turned off. The hashed lines show the timer-circuit 60 in the closed position.

The pre-set period allows a user to enter and start the vehicle; in the event that the user takes no action before the pre-set period of time expires, the timer 50 will allow the timer-circuit 60 to open, resulting in the system 40 being turned off and terminating the transmission of the ERFTS. If a user still wants to start the vehicle, they will have to press/repress the function-unlock-button 2 and the cycle is repeated.

The timer 50 can be adjust to control the amount of time that the pre-set period of time can have, the pre-set period of time can be adjusted from zero-seconds to infinity-seconds. The initial push of the triple-action plunger 20A is long enough to allow the function of the function-unlock button 2 to be carried out and the timer 50 to be activated. In our examples, current is flowing in a clockwise direction. The initial push of the triple-action plunger 20A is long enough to allow the function of the function-unlock-button 2 to be carried out and the timer 50 to be activated. In our examples, current is flowing in a clockwise direction.

Figure 4:
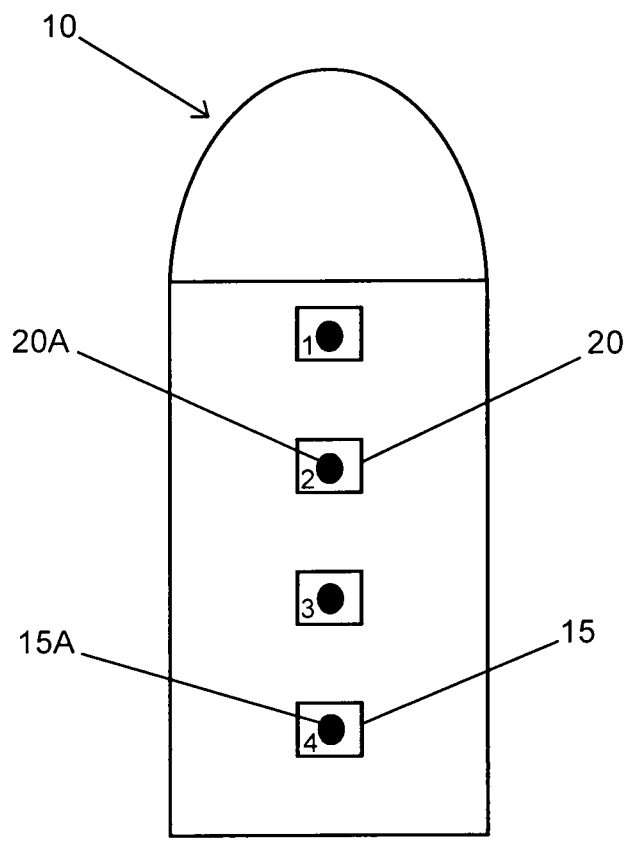
FIG. 4 shows a view of an iPCB with switches numbered 1-4 according to an embodiment of the present invention.

FIG. 4 is an example and an embodiment of an iPCB 10; it has four switches that are numbered 1-4. Number 1, 3, and 4 are double-action switches 15 while the number 2 is a triple-action switch 20. The number 1 switch is beneath the function-lock-button 1, the number 2 switch is beneath the function-unlock-button 2, the number 3 switch is beneath the function-trunk release-button 3 and the number 4 switch is beneath the function-alarm-button 4.

Figure 5:
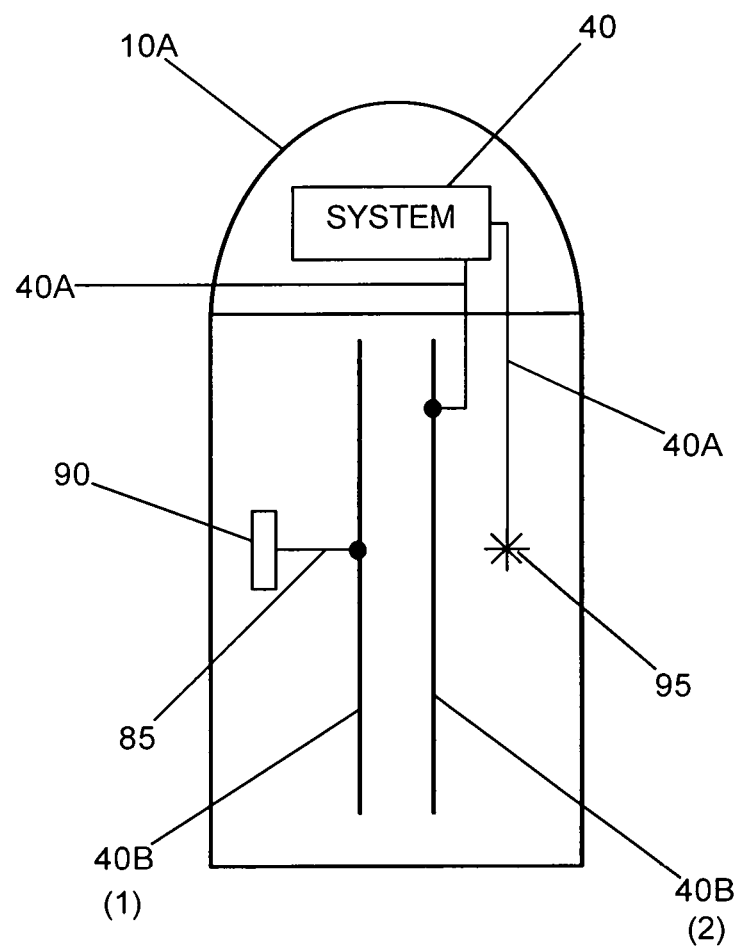
FIG. 5 shows a back view of an iPCB, system, system-traces, ps-trace, parallel-traces, positive battery contact and negative battery contact according to an embodiment of the present invention.

FIG. 5 is an example and an embodiment that shows the back of an iPCB 10A with a few of the electronic components that we will be focusing on: a system 40, a system-traces 40A, parallel-trace 40B, a ps-trace 85, a positive-battery contact 90 and a negative-battery contact 95. When an iFOB key 5 is assembled, the negative-battery contact 95 will be in contact with the battery's 100 negative (−) surface 100B and the positive-battery contact 90 will be in contact with the battery-junction 65 which will be in contact with the battery's positive (+) surface 100B. In this illustration the negative-battery contact 95 is connected to the system 40 with a system-trace 40A. A system-trace 40A also connects the system 40 to parallel-trace2 40B while a ps-trace 85 connects the positive-battery contact 90 to a parallel-trace1 40B.

Figure 6:
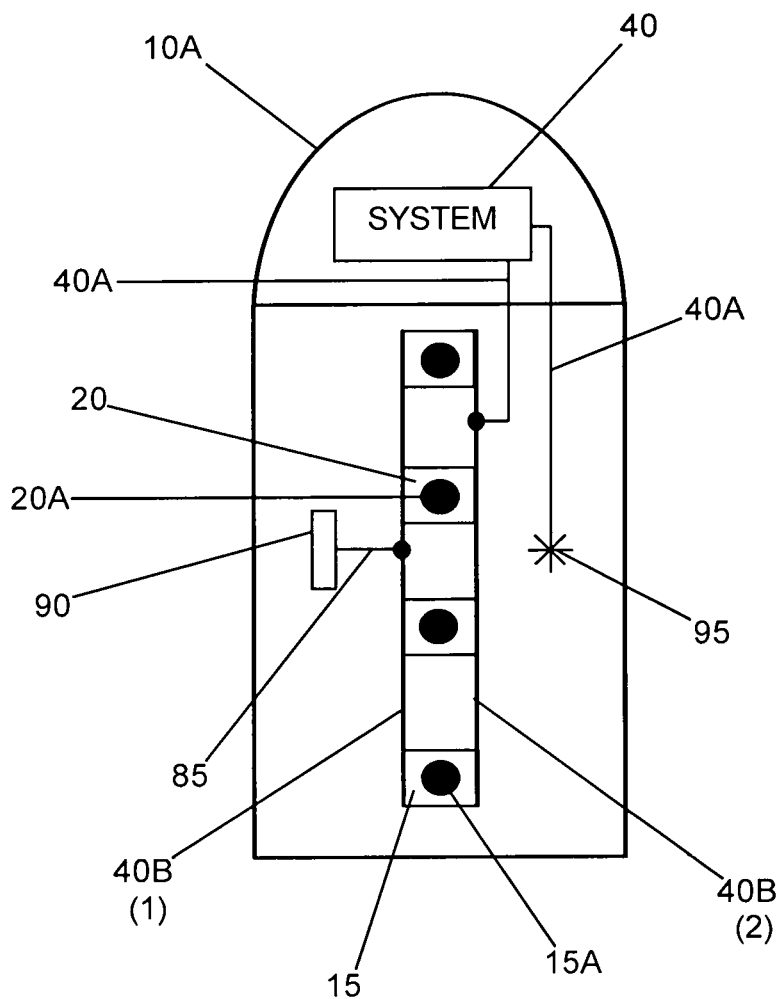
FIG. 6 shows a back view of an iPCB, outlined circuitries, switches and the system according to an embodiment of the present invention.

FIG. 6 is an example and an embodiment that shows the back of an iPCB 10A that displays three double-action switches: function-lock, function-trunk release, function-alarm and one triple-action switch: the function-unlock. The switches are normally positioned on the front side of an iPCB 10 but for demonstration purposes only, they are shown as being positioned on the backside of an iPCB 10. Even though in this example the components appear to all be on the same side of an iPCB 10, again, this is for demonstration purposes only because the components are actually placed on both sides of an iPCB 10. This arrangement is set forth so that a better understanding of how the CSCA works once it is integrated into an iPCB 10.

Figure 8:
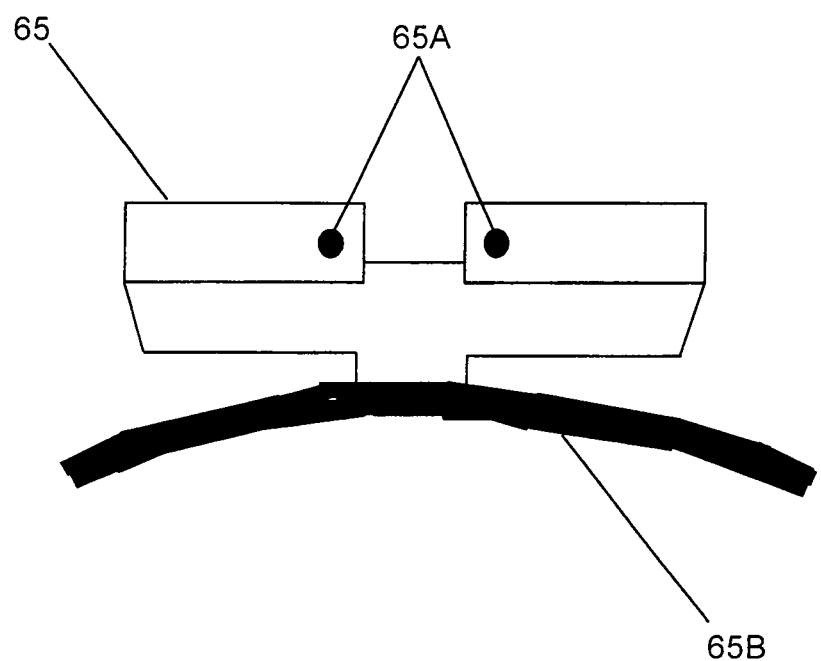
FIG. 8 is a view of a battery junction according to an embodiment of the present invention.
Figure 8A:
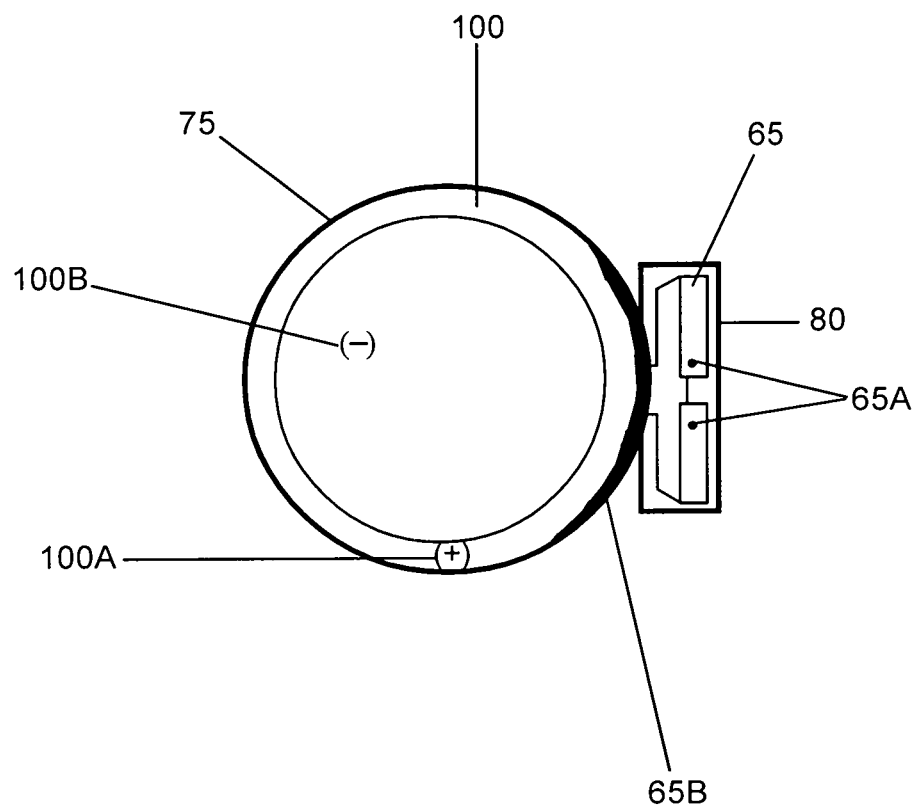
FIG. 8A is a view of a battery slot, a battery, a battery junction housing, and a battery junction according to an embodiment of the present invention.

Once an iPCB 10 is positioned in place and a switch is pushed, current from the battery's negative (−) surface 100B flows through the negative-battery contact 95, through a system-trace 40A, through a system 40, through a system-trace 40A, through parallel-trace2 40B, through a switch 15/20, through a parallel-trace1 40B, through a ps-trace 85, through a positive-battery contact 90, through a battery-junction 65, see FIGS. 8 and 8A, and back to the battery's positive (+) surface 100B of the battery 100.

Figure 7:
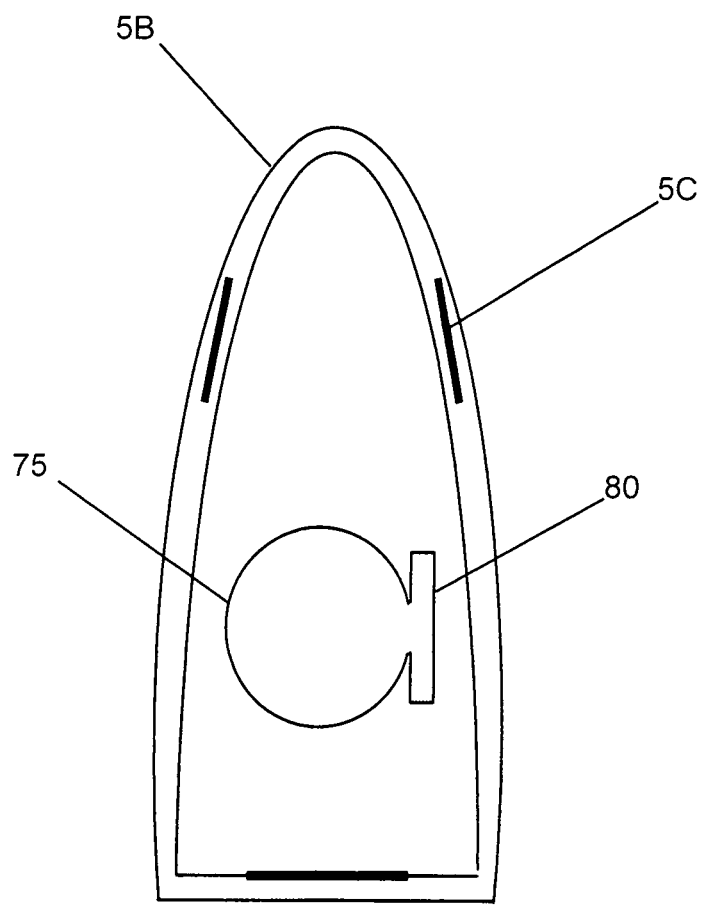
FIG. 7 is a view of a back half of an iFOB case with a battery slot and a battery junction housing according to an embodiment of the present invention.

FIG. 7 is an example and an embodiment of a back-half of an iFOB case 5B; it shows the snap-edges 5C that are responsible for holding the front-half of the iFOB case 5A and the back-half of the case 5B together and securing the internal components. The battery-slot 75 holds a battery 100, and the battery-junction housing 80 holds a battery-junction 65.

FIG. 8 is an example and an embodiment that shows a battery-junction 65 that has contact-nodules 65A and a battery-contact 65B. The contact-nodules 65A comes in contact with the positive-battery contact 90 and the battery-contact 65B comes in contact with the battery's positive (+) surface 100B of a battery 100. The battery-junction 65 allows for current to flow from a positive-battery contact 90 to the battery's positive (+) surface 100B of a battery 100, see FIG. 8A.

FIG. 8A is an example and an embodiment that shows a battery 100 placed into the battery-slot 75 and a battery-junction 65 placed into the battery-junction housing 80. The battery-junction 65 with the contact-nodules 65A offers a spring like action, this is so when the contact-nodules 65A are in contact with a positive-battery contact 90, it will give just enough to exert an upward force thus ensuring a firm contact.

Figure 9:
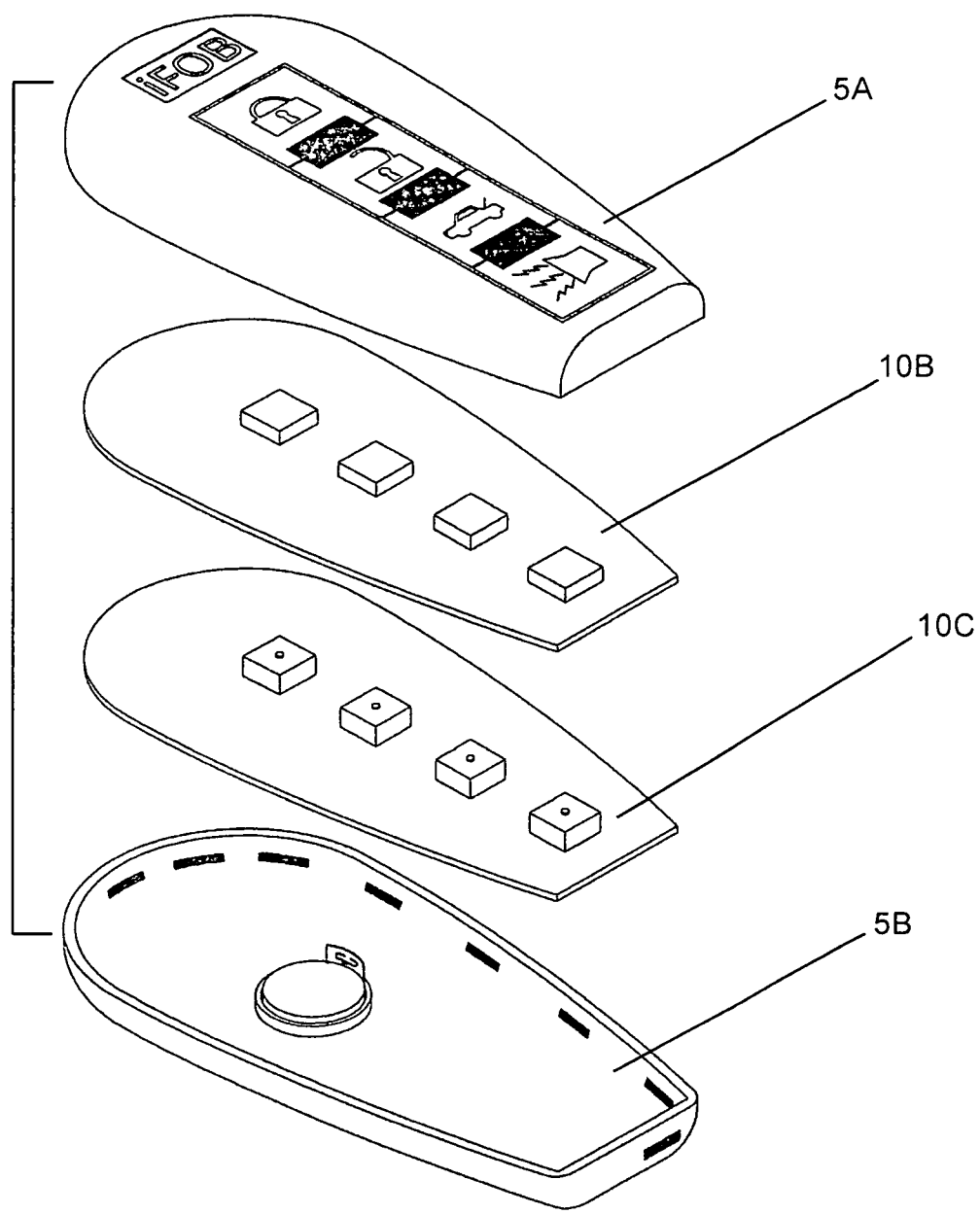
FIG. 9 shows an exploded view of an iFOB key according to an embodiment of the present invention.

FIG. 9 is an example and an embodiment of an iFOB key 5 displaying a front-half of an iFOB case 5A, a rubber-button pad 10B, an iPCB 10C and a back-half of an iFOB case 5B. The back-half of the iFOB case 5B has a battery 100 inserted into the battery-slot 75, a battery-junction housing 80 with a battery-junction 65 in place.

Next is an iPCB 10C, it gets placed into the back-half of the iFOB case 5B, this will put the positive-battery contact 90 in contact with the battery-junction 65 and at the same time it will put the negative-battery contact 95 in contact with the battery's negative (−) surface 100B. Next the rubber-button pad 10B is placed over an iPCB 10C; this will protect the iPCB 10C from any elements such as liquids or solids that may be able to enter from the front-half of an iFOB case 5A. Lastly the front-half of an iFOB case 5A is put over the rubber-button pad 10B and the two halves of an iFOB key 5 are snapped and held together by the snap-edges 5C. The results of an assembled iFOB key 5 can be seen in FIG. 10.

When an iPCB 10 is placed inside of the back-half of an iFOB case 5B the negative battery-contact 95 of the iPCB 10 will be in contact with the battery's negative (−) surface 100B and the battery-junction 65 will be in contact with the positive-battery contact 90 of the iPCB 10 and the battery's positive (+) surface 100A.

Figure 10:
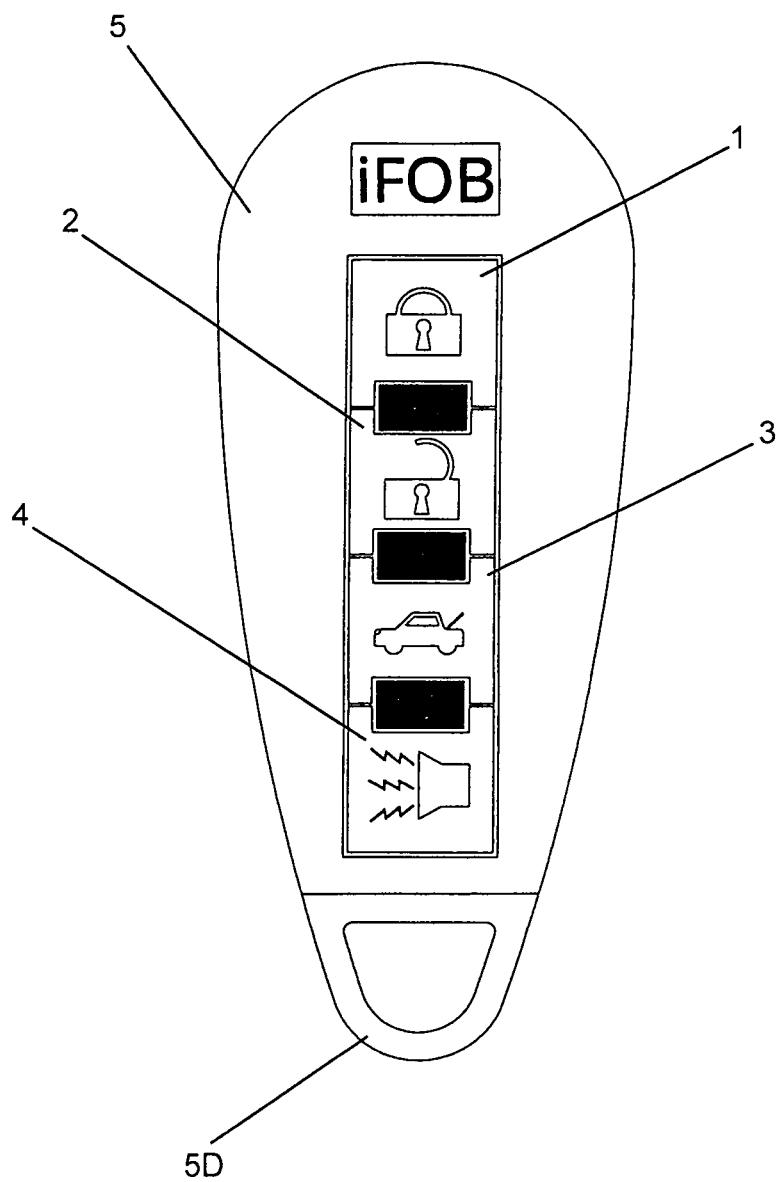
FIG. 10 shows a front view of an assembled iFOB key according to an embodiment of the present invention.

FIG. 10 is an example and an embodiment of an assembled iFOB key 5 that had been assembled from the disassembled components in FIG. 9; the spare-key 5D is present and inserted into the iFOB key 5. This illustration also shows how the function buttons are placed into their respective positions.

Figure 11:
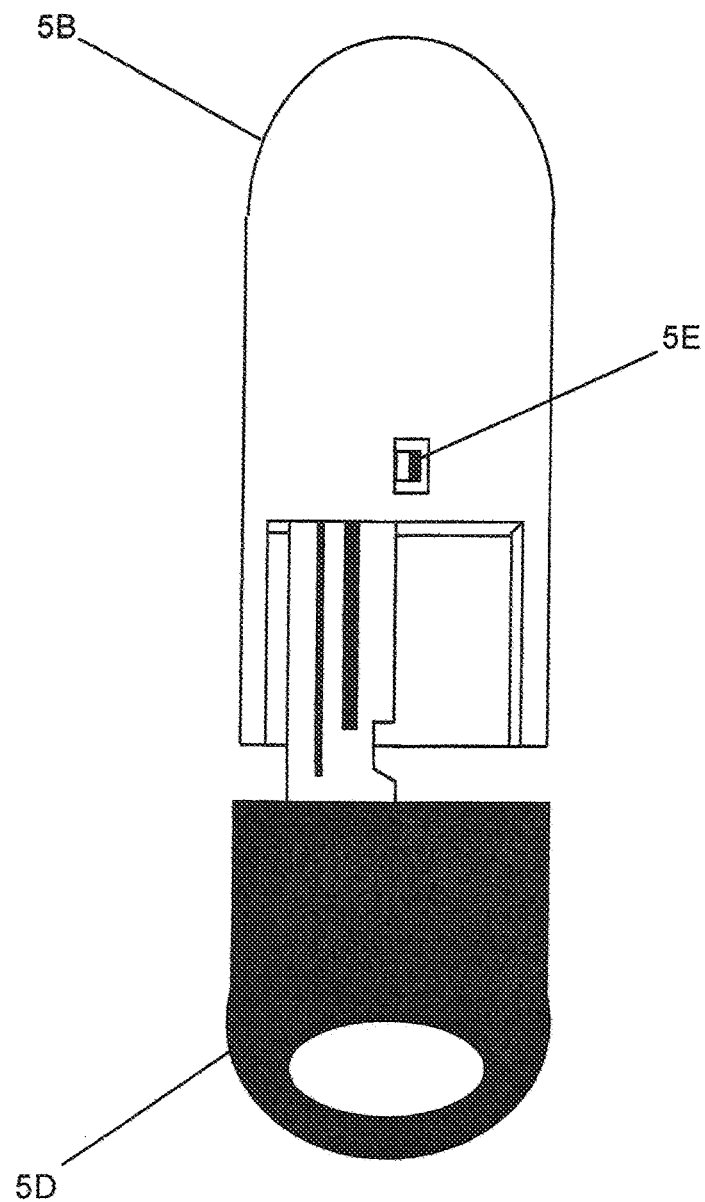
FIG. 11 shows a back view of an iFOB key with a spare key partially inserted according to an embodiment of the present invention.

FIG. 11 is an example and an embodiment that shows the backside 5B of an iFOB key 5B with a spare-key 5D partially inserted into its storage area; the spare-key 5D is normally completely inserted into its storage slot when its not being used, see FIG. 10. There is also a spare key trigger release 5E; which is used for securing and releasing the spare-key 5D from its storage area.

In this example, when the function-lock button 1 of an iFOB key 5, similar to the one seen in FIG. 10, is pressed, this action will push a corresponding double-action switch 15. The pressing of this double-action switch 15 will close the system-contacts 25; this closing will allow current to flow from the battery's negative (−) surface 100B to the negative-battery contact 95 and on through the system-trace 40A to the system 40, thus turning on the system 40 in the process; current then flows out of the system 40, through the system-trace 40A, through the parallel-trace2 40B, through system-contacts 25 of the double-action switch 15, through the parallel-trace1 40B, through the ps-trace 85, through to the positive battery contact 90, then through the battery junction 65, and back through to the battery's positive (+) surface 100A of the battery 100. This process of current being able to flow begins as soon as the function-lock-button 1 is pressed; this process is also terminated once the function-lock-button 1 is released. The pressing of anyone of the function buttons will turn on the system 40 and the release of anyone of the function buttons, except the function-unlock button 2, will turn off the system 40; the function-unlock button 2 will allow the system 40 to remain on for a pre-set period of time even after the function-unlock button 2 has been released. As the system 40 is being turned on, the functions 45 are activated so that the initial function of the function-lock-button 1 can be performed: the locking of the locks. Turning on of the system 40 will allow the ERFTS to start transmitting. One of the advantages of having the system 40, of the iFOB key 5, always off until it is turned on gives the iFOB key 5 an added layer of protection by not having its ERFTS transmitting when the iFOB key 5 is not in use, it is this type of protection that the current fob keys are lacking and do not offer. This method of protection will help in the prevention of having a customer's property compromised.

Of the four switches, switch 1, switch 3 and switch 4, allow the system 40 and the ERFTS to be on only for the duration that their corresponding function button is being pressed, when the function button is released, the system 40 is turned off and the ERFTS transmission is terminated. Switch 2 will allow for the system 40 and the ERFTS to be operational for a pre-set period of time even after the function button has been released. Once the pre-set period of time has expired, the system 40 is turned off and the ERFTS terminated is terminated.

The iFOB key 5 consist of but not limiting to the embodiment of its parts. Let it be known that this description is set forth so that an understanding of my invention can be obtained and none of this information should be interpreted as limiting my invention in any way. The advantages of the embodiment include, and without limitations, that this invention is easy implement and operate, cost effective and user friendly. The descriptions are to be considered for illustrative purposes and not restrictive in character in any way.

The invention claimed is:

1. A method of operating an intelligent key fob (iFOB), operating a control switch connection apparatus (CSCA) that control a transmitter configured to transmit command signals to a control unit of a vehicle for a control duration of time, the CSCA controls a system from an inactive state to an active state and back to the inactive state, the method comprising the steps of:
(a) pressing any one of a function-lock button (1), a function-trunk release button (2) or a function-alarm button (4);
(b) turning on the system and an Electronic Radio Frequency Transmitting Signal (ERFTS); wherein turning on the system and the ERFTS, transmitting a particular command signal to the vehicle in response to the pressing;
(c) releasing any one of the function-lock button (1), the function-trunk release button (2) or the function-alarm button (4) that result in said system and the ERFTS being turned off thus returning said system back to the inactive state;
(d) pressing a function-unlock button (2);
(e) turning on the system, the ERFTS and a timer; wherein the timer that allows the system to remain on for a preset period of time by allowing current to be rerouted through an alternate circuit that bypasses a switch of the timer, once the function-unlock button (2) has been released, the function-unlock button (2) releases the pushing of the switch of timer,
(f) transmitting an unlock command signal to the vehicle in response to the pressing of the function-unlock button (2);
(g) releasing the function-unlock button (2), the system remains on and in active state for the preset period of time after the function button and the switch of the timer has been released.

2. The method of claim 1, pressing any one of the function-lock button (1), the function-trunk release button (2) or the function-alarm button (4), the system and ERFTS turns on for a period of time.

3. The method of claim 1, wherein the system which consist of electronic integrated circuitries.

4. The method of claim 1, when the preset period of time expires, the system turns off and return back to the inactive state.

* * * * *